H. HULETT.
SYSTEM OF UNLOADING CARS INTO VESSELS.
APPLICATION FILED JUNE 17, 1912.
1,066,015.
Patented July 1, 1913.
2 SHEETS—SHEET 2.
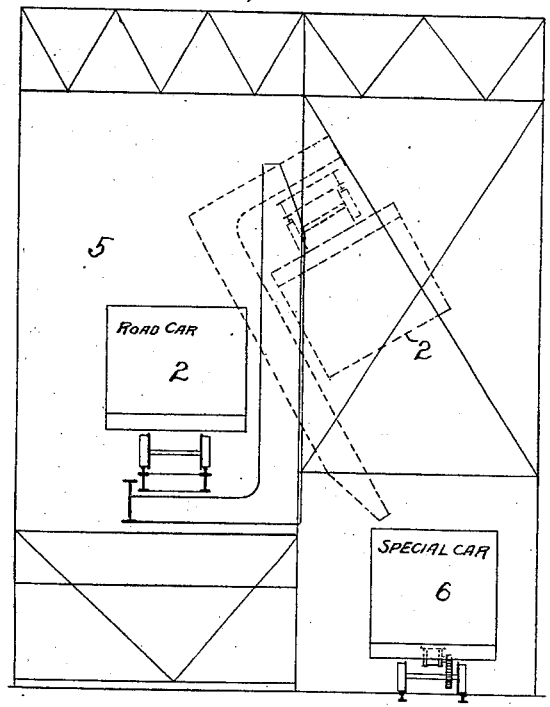
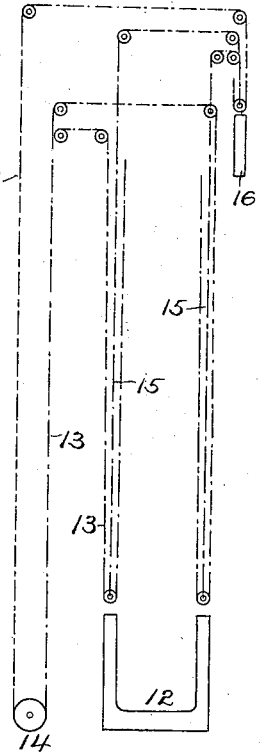
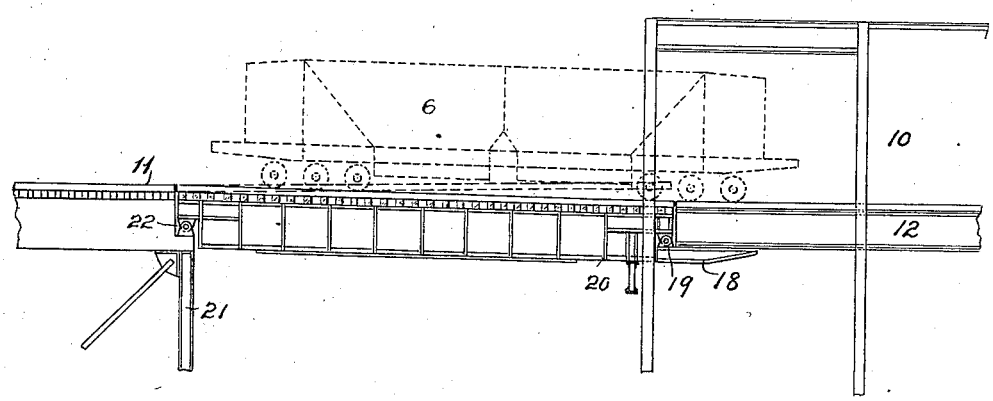
WITNESSES
INVENTOR
Attorney

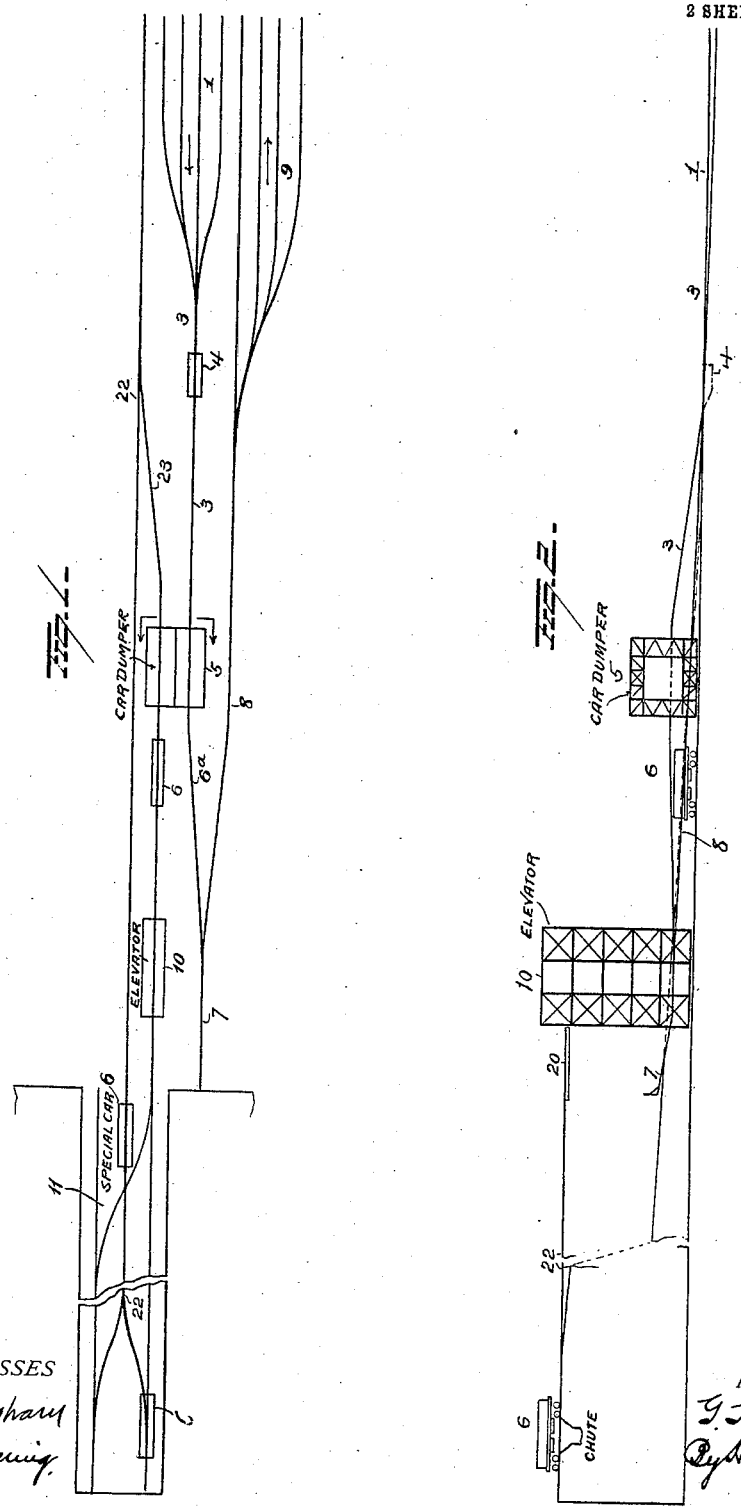

UNITED STATES PATENT OFFICE.

GEORGE H. HULETT, OF CLEVELAND, OHIO, ASSIGNOR TO THE WELLMAN-SEAVER-MORGAN COMPANY, OF CLEVELAND, OHIO.

SYSTEM FOR UNLOADING CARS INTO VESSELS.

1,066,015.   Specification of Letters Patent.   Patented July 1, 1913.

Application filed June 17, 1912. Serial No. 704,159.

*To all whom it may concern:*

Be it known that I, GEORGE H. HULETT, a citizen of the United States, and a resident of Cleveland, in the county of Cuyahoga and State of Ohio, have invented certain new and useful Improvements in Systems for Unloading Cars Into Vessels; and I do hereby declare the following to be a full, clear, and exact description of the invention, such as will enable others skilled in the art to which it appertains to make and use the same.

My invention relates to an improvement in systems for unloading cars into vessels, and it comprises means for tilting an ordinary car and dumping its load into a motor driven automatic dumping car; an elevator for lifting said automatic dumping car to an elevated trestle provided with a track, and with a bin or chute into which the contents of the automatic dumping car are automatically discharged, and a downwardly inclined track leading from the trestles to the car dumper, whereby the automatic dumping car is returned to the car dumper for another load.

In the accompanying drawings, Figure 1 is a diagrammatic view in plan of my improved system. Fig. 2 is a similar view in side elevation. Fig. 3 a view in end elevation of a car dumper. Fig. 4 is a view of a part of the elevator and the run off girder and Fig. 5 is a diagrammatic representation of one of the elevators and its counterweight.

1 represents the yard in which the loaded road cars 2 are stored and 3 a track leading from the storage yard 1 to the car dumper. The track 3 from the yard 1 to the mule pit 4, is downwardly inclined and from the mule pit 4 to the car dumper 5, it is upwardly inclined as shown in Fig. 2. The mule pit is simply a shallow pit located between the rails to receive a pusher car, commonly known as a Barney car, which, after the loaded car has passed the mule pit and over the Barney car the latter is drawn by cable or other means from the pit and engages the loaded car from behind and pushes it onto the car dumper platform. The contents of the road car 2 are then dumped by the car dumper 5, into the special car 6, which latter is of the self dumping electrically operated type, capable of propelling itself on a level trackway and up slight grades. After the road car has dumped its load and has been restored to its upright position, it passes off onto the track 6ª, which is downwardly inclined to the kick back 7, and thence back on the downwardly inclined track 8 to the yard 9 for empty cars. It will therefore be seen that the movements of the road cars 2 are controlled by gravity except at the approach to the dumper 5. The special car 6, after it receives the contents of the road car 2 propels itself to the elevator 10, and onto the elevator platform of same, and is elevated to the level of the dock trestle or elevated tracks 11 on the pier.

The elevator 10 comprises a shaft and platform 12, shown in side elevation in Fig. 4, and diagrammatically in Fig. 5. This platform is connected by cables 13 with the hoist drum 14, and by cables 15 with the counterweight 16. The counterweight is also connected to the drum 14 by the cable 17. The cables 13 and 17 are wound in opposite directions, so that when one is winding the other is unwinding. The weight of the counterweight is considerably in excess of the weight of the elevator platform, but is lighter than the combined weight of the platform and a loaded car thereon, and as the counterweight is connected to the elevator platform and also to the winding drum, it will be seen that by rotating the latter in a direction to positively lift the counterweight, it will unwind the elevator platform ropes 13 and thus permit the elevator to descend. I prefer to so proportion the weight of the counterweight and the loaded platform, as to about equally divide the power necessary to raise the platform and its loaded car and the power necessary to lift the counterweights and permit the empty platform to return to the track level. The principal advantage of this construction over the ordinary form of elevator is that it very largely reduces the size of the motors and engines necessary to lift the load, and greatly reduces the cost of installation and the subsequent cost of operating the elevator.

The elevator platform 12 is provided at its end adjacent the pier with projecting members 18, carrying the pivoted sill 19, which latter, as the elevator platform is raised, engages the underside of the adjacent free end of the run off girders 20, carrying that portion of the track between the pier trestle 21 and the elevator 10. The run off girder 20 is hinged at its outer end as at 22, to the trestle, and its inner end projects into the elevator shaft and in the path of the projecting members 18, so that as the elevator rises it engages the adjacent ends of the run off girder and lifts it so that the track on the elevator platform will aline with the track on the girder 20, thus avoiding the necessity of providing means for stopping the platform at a particular point, so as to have the track thereon aline with the track on the hinged run off girders, and also avoiding the necessity of stopping the apparatus to take up any slack due to stretching of the cables. The run off girders connect the elevator with the trestle 21 on the pier, and after the elevator reaches the proper level, the special car 6 thereon passes from the platform 12 onto the track on the hinged run off girder, and from thence to the trestle 21 on the pier. This trestle carries chutes of the ordinary form leading to bins under the trestle, or to the hold of a vessel, and as the car 6 passes over the chute its load is automatically dumped. After it passes the chute its direction of movement is reversed and it is switched onto a gravity track 22, leading from the trestle back to a point beyond the car dumper. It is then switched onto track 23 leading to the dumper and is again filled and the operation repeated.

With this system it will be seen, that, with the exception of the upward incline from the mule pit to the dumper, all movements of the road car are by gravity, and by employing an elevator for lifting the special cars to the pier trestle, instead of pushing them up an incline, several hundred feet of dock yard may be saved, as well as the additional time that would be required in pushing the cars up a long incline.

The entire operation consists in taking a loaded road car from the car storage tracks, by gravity to a mule car. It is then pushed up the grade into the car dumper and inverted so as discharge its contents into a special car 6 provided with an automatic dump and with electric motor for propelling the same. The empty road car 2, is then shunted onto a gravity track leading to the yard 9 for empty cars. The special self dumping car 6, is then run over a scale where it is weighed and from thence onto the elevator platform. The car is then elevated to the height of the trestle and is run out thereon and its coal dumped into the bins under the trestle, from which it is discharged into the boats by chutes leading from the bins. The empty car is then run to the outer end of the trestle and back through a switch and down an incline to the car dumper for another load. By this system the operation is continuous, the cars, both road and special, following one another as rapidly as they can be handled by the car dumper and elevator.

Having fully described my invention what I claim as new and desire to secure by Letters-Patent, is:—

1. Means for unloading cars into vessels, comprising appliances for tilting the car and dumping its contents, motor driven automatic dumping car adapted to receive the load discharged from said first mentioned car, an elevator for lifting the automatic dumping car to an elevated trestle, an elevated trestle having a chute into which the contents of the automatic dumping car are dumped, and a downwardly inclined track leading from said trestle back to the car dumper whereby the automatic dumping car will be returned to its starting point.

2. Means for unloading cars into vessels comprising a car dumper for dumping the contents of a road car into a special car having automatic dumping means, a trackway leading from said dumper to an elevator, an elevator for lifting said special car, a trestle onto which said special car is run from the elevator, the said trestle carrying a chute into which the contents of the special cars are dumped, a downwardly inclined track on said trestle extending back to the car dumper, whereby the special cars make a circuit of the dumper, elevator, trestle, and back to the dumper, and a gravity track leading from one car storage yard to the car dumper and from thence back to another car storage yard.

In testimony whereof, I have signed this specification in the presence of two subscribing witnesses.

GEORGE H. HULETT.

Witnesses:
H. A. PELOUBE,
C. L. SWAISGOOD.

---

Copies of this patent may be obtained for five cents each, by addressing the "Commissioner of Patents, Washington, D. C."